W. L. HALE.
DEMOUNTABLE RIM FASTENER.
APPLICATION FILED DEC. 6, 1913. RENEWED FEB. 13, 1915.
1,153,068.
Patented Sept. 7, 1915.
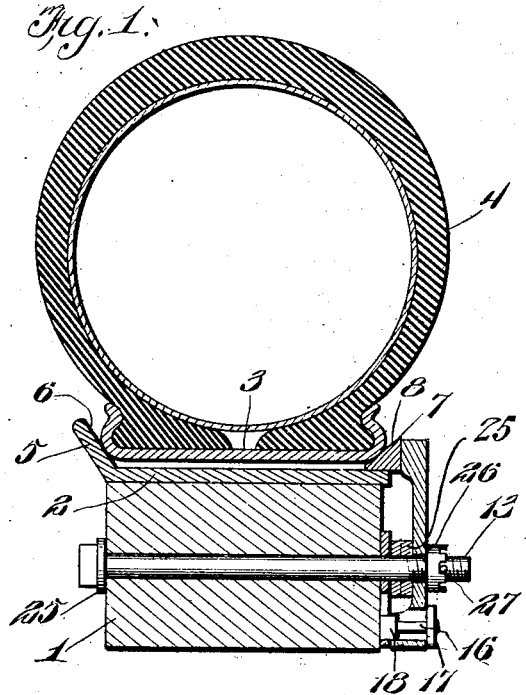
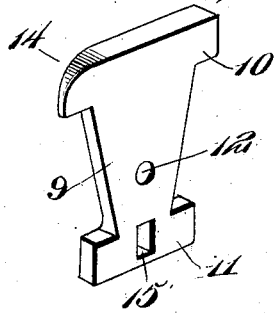
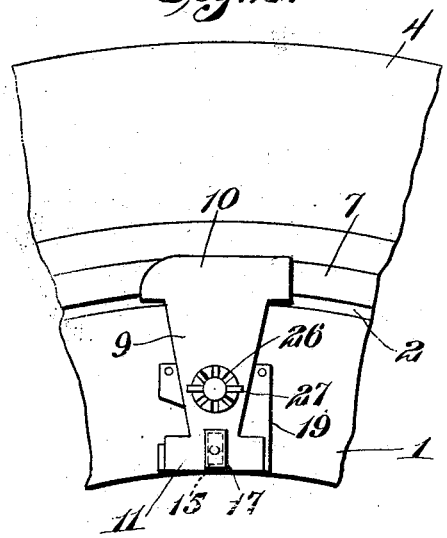
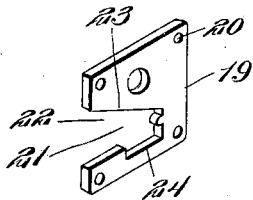
Inventor
Willis L. Hale
Witnesses
By Victor J. Evans
Attorney

UNITED STATES PATENT OFFICE.

WILLIS L. HALE, OF NORTH ATTLEBORO, MASSACHUSETTS.

DEMOUNTABLE-RIM FASTENER.

1,152,068.                    Specification of Letters Patent.          Patented Sept. 7, 1915.

Application filed December 6, 1913, Serial No. 805,052. Renewed February 13, 1915. Serial No. 8,030.

*To all whom it may concern:*

Be it known that I, WILLIS L. HALE, a citizen of the United States, residing at North Attleboro, in the county of Bristol and State of Massachusetts, have invented new and useful Improvements in Demountable-Rim Fasteners, of which the following is a specification.

This invention relates to demountable rim fasteners the object of the invention being to provide a simple, practical and easily operated fastening device for maintaining demountable rims and the tires carried thereby on the fellies of vehicle wheels, the said device being operable by means of a hammer or like implement and doing away with the necessity of removing screws, bolts and similar devices such as are now commonly employed in fastening demountable rims on wheels.

With the above and other objects in view, the invention consists in the construction, combination and arrangement of parts, as will hereinafter be more fully described, illustrated and claimed.

In the accompanying drawings:—Figure 1 is a cross section through the felly of a wheel and also through a demountable rim and tire showing the fastening device of this invention applied thereto. Fig. 2 is a side elevation of a portion of a wheel felly and tire also showing the present invention in use thereon. Fig. 3 is a detail perspective view of one of the clamps. Fig. 4 is a similar view of one of the slidable locks or locking members. Fig. 5 is a detail view of one of the locking plates or keepers.

Referring now to the drawings 1 designates a wheel felly, 2 a metal rim fastened in any suitable manner to the felly 1, 3 a tire carrying rim and 4 an ordinary tire mounted on the rim 3 and demountable therewith from the rim 2 on the felly 1.

In carrying out the present invention the rim 2 which is fixedly attached to the felly 1 is provided at one side with a flange 5 having an inclined inner face 6 the purpose of which will presently appear.

In connection with the rim 2 and its flange 5 I employ a wedge ring 7 having an inclined inner face 8 which corresponds with the inclined inner face 6 of the flange 5, the rim 3 being held between the inclined faces 6 and 8 when the wedging ring 7 is forced inward by the fastening device of this invention.

In connection with the felly 1 and the wedging ring 7 I employ a series of fastening devices, one of which is illustrated in Figs. 1 and 2 applied to the felly. Each fastening device embodies a clamping member comprising a body 9, a T shaped head 10 and a T shaped base 11, the body 9 being provided with a bolt hole 12 through which passes a bolt 13 extending through a hole in the felly 1 as shown in Fig. 1, the bolt 13 forming a pivot around which the clamping member is adapted to be turned.

The head 10 of the clamping member is rounded at opposite ends on the inner face thereof as shown at 14 so as to facilitate moving the head 10 into and out of engagement with the outer vertical face of the wedging ring 7 as indicated in Fig. 1. Adjacent to the junction of the base 11 with the body 9, the clamping member or device is provided with a slot 15 in which is received the shank 16 of a slidable lock or locking device shown in detail in Fig. 4, said locking device being held by friction to prevent it from moving outwardly by centrifugal force. This lock comprises two heads 17 and 18 at opposite ends of the shank 16, the head 17 being the larger and being arranged on the outer face of the clamping device while the smaller head 18 is arranged to slide against the inner face of the clamp and to engage a keeper or locking plate 19 shown in detail in Fig. 5. The plate 19 is provided with screw holes 20 adapting it to be fastened to the side of the felly 1 in fixed relation thereto and the said keeper or locking plate is provided with a slot 21 extending inwardly from one of the side edges thereof, the entrance to said slot being flared outwardly as shown at 22 providing an inclined edge or shoulder 23 against which the head 18 is adapted to ride as it moves into the inner portion of the slot. The inner end of the slot 21 terminates in a drop notch 24 in which the head 18 finally rests when the parts are in their final positions. Suitable washers 25 may be arranged at opposite sides of the felly and a nut 26 preferably of the castellated type, the bolt 13 being provided with a hole 27 for the reception of a split cotter pin which used in conjunction with the nut 26 prevents said nut from working loose.

In order to remove the demountable rim 3 from the fixed rim 2, it is necessary to remove the wedging ring 7. To do this the several clamps arranged at intervals around the felly are struck by a hammer so as to turn the several clamps in a clockwise direction, this being done by striking a blow against the left hand side of the head portion 10 of each clamp. Before this is done, however, one or more hammer blows are imparted to the head 17 of the locking device in an outward direction to cause the head 18 of the slidable lock to move upward against the inclined edge 23 of the keeper or locking plate and out of the locking notch 24. This has the effect of unlocking the clamp after which the clamp may be turned in the manner above indicated.

After the demountable rim has been returned to its position on the wheel, the wedging ring 7 is placed in its proper position opposite the flange 5 and each of the clamps is then turned toward its holding position. Hammer blows are then struck on the right hand end of the head 10 of the clamp until it assumes a radial position, after which hammer blows are imparted to the head 17 of the locking device in an inward direction or toward the hub of the wheel thereby driving the head 18 down into the locking notch 24 of the keeper plate 19. As wear takes place between the clamping members and the wedging ring, this may be compensated for by tightening the nut 26.

The device hereinabove described is extremely simple in construction, easy to manipulate and there are no loose parts to become lost, all of the clamps being permanently attached to the felly of the wheel. A rim may be demounted and remounted in a comparatively short space of time, the only tool necessary being a hammer or like implement and in the absence of such an implement, a stone or piece of wood may be used as a substitute for the hammer.

What is claimed is:—

1. The combination with a demountable rim for vehicle wheels, of a circular wedging ring, and fastening means for said rim carried by the wheel and embodying a series of clamps each movable into and out of engagement with said wedging ring, and a locking device for holding each clamp from turning, said locking device comprising a keeper plate fixedly secured to the wheel, and a locking member carried by and slidable on said clamp and movable into and out of locking engagement with said keeper plate.

2. The combination of a wheel, a rim fastened to the wheel felly, a flange at one side of said rim having an inclined inner face, a tire carrying demountable rim, a circular wedging ring having an inclined inner face, and fastening means carried by the wheel embodying a series of pivoted clamps each movable into and out of engagement with said wedging ring, a lock carried by each clamp, and a keeper plate for each lock fixedly secured to the wheel, the lock being movable into and out of engagement with said plate and slidable upon and relatively to the clamp.

In testimony whereof I affix my signature in presence of two witnesses.

WILLIS L. HALE.

Witnesses:
    JOHN P. L. BALLOU,
    W. D. BURLINGAME.